(12) United States Patent
Chen et al.

(10) Patent No.: US 12,744,861 B2
(45) Date of Patent: Sep. 22, 2026

(54) METHOD FOR REPLACING BACKGROUND IN PICTURE, DEVICE, STORAGE MEDIUM AND PROGRAM PRODUCT

(71) Applicant: Beijing Bytedance Network Technology Co., Ltd., Beijing (CN)

(72) Inventors: Yingyi Chen, Beijing (CN); Shaohui Jiao, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 454 days.

(21) Appl. No.: 18/254,575

(22) PCT Filed: Apr. 12, 2022

(86) PCT No.: PCT/CN2022/086428
§ 371 (c)(1),
(2) Date: May 25, 2023

(87) PCT Pub. No.: WO2022/237435
PCT Pub. Date: Nov. 17, 2022

(65) Prior Publication Data

US 2024/0031518 A1 Jan. 25, 2024

(30) Foreign Application Priority Data

May 12, 2021 (CN) ......................... 202110518684.4

(51) Int. Cl.
*H04N 5/272* (2006.01)
*G06T 7/194* (2017.01)
(Continued)

(52) U.S. Cl.
CPC ............. *H04N 5/272* (2013.01); *G06T 7/194* (2017.01); *G06V 10/16* (2022.01); *G06V 10/44* (2022.01); *G06V 10/60* (2022.01); *G06V 10/751* (2022.01)

(58) Field of Classification Search
CPC .... H04N 5/272; H04N 21/2187; H04N 23/61; H04N 23/951; H04N 21/23418;
(Continued)

(56) References Cited

U.S. PATENT DOCUMENTS 8,405,780 B1 * 3/2013 Schaem .................... G06T 5/70 348/576
9,842,420 B2 * 12/2017 Koyama ................ G06T 11/60
(Continued)

FOREIGN PATENT DOCUMENTS

CN 107592490 A 1/2018
CN 108154518 A 6/2018
(Continued)

OTHER PUBLICATIONS

Ding Liu et al. "Real Object Registration Algorithm Based on SURF and RANSAC" Feb. 2022, IEEE (Year: 2022).*
(Continued)

*Primary Examiner* — Edward Park
*Assistant Examiner* — Alejandro Hernandez
(74) *Attorney, Agent, or Firm* — Alleman Hall LLP

(57) ABSTRACT

A method for replacing a background in a picture, a device, a storage medium and a program product provided in the embodiments relate to image processing technologies and include: acquiring a basic background image of a preset scene, where the basic background image is an image obtained by shooting the preset scene in advance; acquiring a captured picture obtained by currently shooting the preset scene, and determining a current background image of the preset scene according to the basic background image and the captured picture; replacing the current background image in the captured picture with a preset background image to obtain a final captured picture.

10 Claims, 6 Drawing Sheets

(51) Int. Cl.

| | |
|---|---|
| ***G06V 10/10*** | (2022.01) |
| ***G06V 10/44*** | (2022.01) |
| ***G06V 10/60*** | (2022.01) |
| ***G06V 10/75*** | (2022.01) |

(58) Field of Classification Search

CPC ..... H04N 21/234345; H04N 21/44012; H04N 21/440245; H04N 23/80; H04N 23/67; H04N 23/60; G06T 7/194; G06T 5/50; G06T 3/04; G06T 3/4038; G06T 7/11; G06T 11/00; G06T 7/10; G06V 10/60; G06V 10/751; G06V 10/16; G06V 10/44; G06V 20/50; G06V 20/00

See application file for complete search history.

(56) References Cited

U.S. PATENT DOCUMENTS

| | | | | |
|---|---|---|---|---|
| 9,898,847 | B2 * | 2/2018 | Wang | G10L 15/22 |
| 9,948,893 | B2 * | 4/2018 | Barzuza | H04L 65/403 |
| 10,567,739 | B2 * | 2/2020 | Middleton | G06T 7/50 |
| 10,887,531 | B2 | 1/2021 | Punja et al. | |
| 10,999,499 | B2 * | 5/2021 | Buford | G06T 7/194 |
| 11,954,764 | B2 * | 4/2024 | Nguyen | G06T 11/10 |
| 2004/0008773 | A1 * | 1/2004 | Itokawa | G08B 13/19689 348/E7.086 |
| 2005/0013490 | A1 * | 1/2005 | Rinne | G06V 40/161 382/226 |
| 2005/0175101 | A1 * | 8/2005 | Honda | H04N 19/29 375/E7.182 |
| 2009/0297061 | A1 * | 12/2009 | Mareachen | H04N 19/132 382/285 |
| 2010/0014781 | A1 | 1/2010 | Liu et al. | |
| 2013/0162867 | A1 * | 6/2013 | Gupta | G06T 7/194 348/239 |
| 2013/0258138 | A1 * | 10/2013 | Ma | H04N 5/272 348/239 |
| 2014/0152658 | A1 * | 6/2014 | Ahn | G06T 15/00 345/419 |
| 2014/0368669 | A1 * | 12/2014 | Talvala | G06T 7/194 348/207.1 |
| 2016/0078598 | A1 * | 3/2016 | Tanabe | G06T 3/4007 382/284 |
| 2016/0191898 | A1 * | 6/2016 | Xu | G02B 13/0085 348/47 |
| 2016/0284096 | A1 | 9/2016 | Buford et al. | |
| 2017/0142371 | A1 * | 5/2017 | Barzuza | H04L 65/403 |
| 2017/0154450 | A1 | 6/2017 | Wang | |
| 2017/0308990 | A1 * | 10/2017 | Middleton | G06T 7/50 |
| 2019/0313071 | A1 * | 10/2019 | Chen | G06T 11/00 |
| 2020/0211201 | A1 * | 7/2020 | Chiang | H04N 5/2621 |
| 2021/0217179 | A1 * | 7/2021 | Li | G06T 7/194 |
| 2021/0312638 | A1 * | 10/2021 | Ito | G06T 7/136 |
| 2021/0357675 | A1 * | 11/2021 | Nakamura | G06V 40/193 |
| 2022/0038641 | A1 * | 2/2022 | Chang | G06T 7/11 |
| 2022/0245941 | A1 * | 8/2022 | Zhu | G06V 20/52 |
| 2023/0178072 | A1 * | 6/2023 | Hwang | G06N 3/04 704/232 |
| 2024/0031518 | A1 * | 1/2024 | Chen | G06T 7/11 |
| 2024/0071010 | A1 * | 2/2024 | Brent | G06V 10/26 |
| 2024/0404014 | A1 * | 12/2024 | Hassbring | G06T 5/50 |
| 2025/0157092 | A1 * | 5/2025 | Fitzpatrick | G06T 11/00 |
| 2025/0245986 | A1 * | 7/2025 | Song | G06V 20/50 |
| 2025/0272807 | A1 * | 8/2025 | Canet | G06T 5/77 |

FOREIGN PATENT DOCUMENTS

| | | | | |
|---|---|---|---|---|
| CN | 110891181 | A | 3/2020 | |
| CN | 111464761 | A | 7/2020 | |
| CN | 112351291 | A | 2/2021 | |
| CN | 112601099 | A | 4/2021 | |
| CN | 112686131 | A | 4/2021 | |
| CN | 113259698 | A | 8/2021 | |
| JP | 2009098718 | A | 5/2009 | |
| JP | 2010183560 | A | 8/2010 | |
| JP | 2011041041 | A | 2/2011 | |
| JP | 2014192557 | A | 10/2014 | |
| JP | 2017212592 | A | 11/2017 | |
| JP | 7592954 | B2 | 12/2024 | |
| TW | 202514531 | A * | 4/2025 | H04N 5/74 |
| WO | 2015032099 | A1 | 3/2015 | |
| WO | 2020110169 | A1 | 6/2020 | |

OTHER PUBLICATIONS

Japan Patent Office, Decision to Grant a Patent for Japanese Patent Application No. 2023-532118 dated Oct. 22, 2024, 5 pages.

Japan Patent Office, Office Action Issued in Application No. 2023532118, Jul. 2, 2024, 10 pages.

European Patent Office, Extended European Search Report Issued in Application No. 22806405.1, Jul. 22, 2024, Germany, 10 pages.

China National Intellectual Property Administration, Office Action and Search Report Issued in Application No. 202110518684.4, Jun. 1, 2022, 9 pages (submitted with English summary).

ISA China National Intellectual Property Administration, International Search Report Issued in Application No. PCT/CN2022/086428, Jun. 17, 2022, WIPO, 16 pages.

China National Intellectual Property Administration, Notice of Grant Issued in Application No. 202110518684.4, Oct. 10, 2022, 7 pages (submitted with English summary).

Peking University, "Image extension based on learning," Wangxuan Institute of Computer Technology Graphics Laboratory, May 22, 2023, 5 pages (submitted with English summary).

* cited by examiner

METHOD FOR REPLACING BACKGROUND IN PICTURE, DEVICE, STORAGE MEDIUM AND PROGRAM PRODUCT

CROSS-REFERENCE TO RELATED APPLICATIONS

The present application is a National Stage of International Application No. PCT/CN2022/086428, filed on Apr. 12, 2022, which claims priority to Chinese patent application No. 202110518684.4, entitled "METHOD FOR REPLACING BACKGROUND IN PICTURE, DEVICE, STORAGE MEDIUM AND PROGRAM PRODUCT" and filed on May 12, 2021. Both of the above applications are hereby incorporated by reference in their entireties.

TECHNICAL FIELD

Embodiments of the present disclosure relate to image processing technologies, and in particular, to a method for replacing a background in a picture, a device, a storage medium, and a program product.

BACKGROUND

With development of network technology, live webcasting is becoming more and more popular at present, and the content of live broadcast is also becoming more and more abundant. For example, information of an object can be introduced to a viewer through the live webcasting.

At present, a background needs to be set during the live webcasting. For example, a projection screen or TV can be placed behind a host to display information through the projection screen or TV.

However, if the projection screen or TV is set, there may be reflections in a captured live broadcast picture, which causes the live broadcast picture unclear.

SUMMARY

Embodiments of the present disclosure provide a method for replacing a background in a picture, a device, a storage medium, and a program product, so as to solve the problem in the prior art that a specific device needs to be set as a live broadcast background, which results in high cost of the live broadcast, and that the specific device may cause the live broadcast picture unclear.

In a first aspect, an embodiment of the present disclosure provides a method for replacing a background in a picture, including:

- acquiring a basic background image of a preset scene, where the basic background image is an image obtained by shooting the preset scene in advance;
- acquiring a captured picture obtained by currently shooting the preset scene, and determining a current background image of the preset scene according to the basic background image and the captured picture; and
- replacing the current background image in the captured picture with a preset background image to obtain a final captured picture.

In a second aspect, an embodiment of the present disclosure provides an apparatus for replacing a background in a picture, including:

- an acquiring unit, configured to acquire a basic background image of a preset scene, where the basic background image is an image obtained by shooting the preset scene in advance;
- where the acquiring unit is further configured to acquire a captured picture obtained by currently shooting the preset scene;
- an identifying unit, configured to determine a current background image of the preset scene according to the basic background image and the captured picture; and
- a background replacing unit, configured to replace the current background image in the captured picture with a preset background image to obtain a final captured picture.

In a third aspect, an embodiment of the present disclosure provides an electronic device, including: at least one processor and a memory;

- where the memory stores a computer-executed instruction; and
- the at least one processor executes the computer-executed instruction stored in the memory, to cause the at least one processor to execute the method for replacing a background in a picture according to the first aspect.

In a fourth aspect, an embodiment of the present disclosure provides a computer-readable storage medium which has a computer-executed instruction stored thereon, and when a processor executes the computer-executed instruction, the method for replacing a background in a picture according to the first aspect is implemented.

In a fifth aspect, an embodiment of the present disclosure provides a computer program product, including a computer program, where when the computer program is executed by a processor, the method for replacing a background in a picture according to the first aspect is implemented.

In a sixth aspect, an embodiment of the present disclosure provides a computer program, where when the computer program is executed by a processor, the method for replacing a background in a picture according to the first aspect is implemented.

A method for replacing a background in a picture, a device, a storage medium and a program product provided in the embodiments include: acquiring a basic background image of a preset scene, where the basic background image is an image obtained by shooting the preset scene in advance; acquiring a captured picture obtained by currently shooting the preset scene, and determining a current background image of the preset scene according to the basic background image and the captured picture; replacing the current background image in the captured picture with a preset background image to obtain a final captured picture. In the solution provided by the embodiments, the current background image in the currently captured picture can be identified by using the basic background image captured in advance, and then the preset background image can be used to replace the current background image in the captured picture. In such a way, without setting a specific background apparatus in the preset scene, the background in the captured picture can be adjusted according to requirements, thereby improving flexibility of replacing the background in the captured picture.

BRIEF DESCRIPTION OF DRAWINGS

In order to describe the technical solutions in embodiments of the present disclosure or prior art more clearly, the following will briefly introduce drawings that need to be used in the description of the embodiments or prior art. Obviously, the drawings described below are some embodiments of the present disclosure, and for those of skilled in the art, other drawings can be obtained based on these drawings without creative efforts.

DESCRIPTION OF EMBODIMENTS

In order to make the purpose, technical solutions and advantages of embodiments of the present disclosure clearer, the technical solutions in the embodiments of the present disclosure will be described as follows clearly and completely in conjunction with accompanying drawings in the embodiments of the present disclosure. Apparently, the described embodiments are a part rather than all of the embodiments of the present disclosure. Based on the embodiments in the present disclosure, all the other embodiments acquired by those skilled in the art without delivering creative efforts shall fall into the protection scope of the present disclosure.

Figure 1:
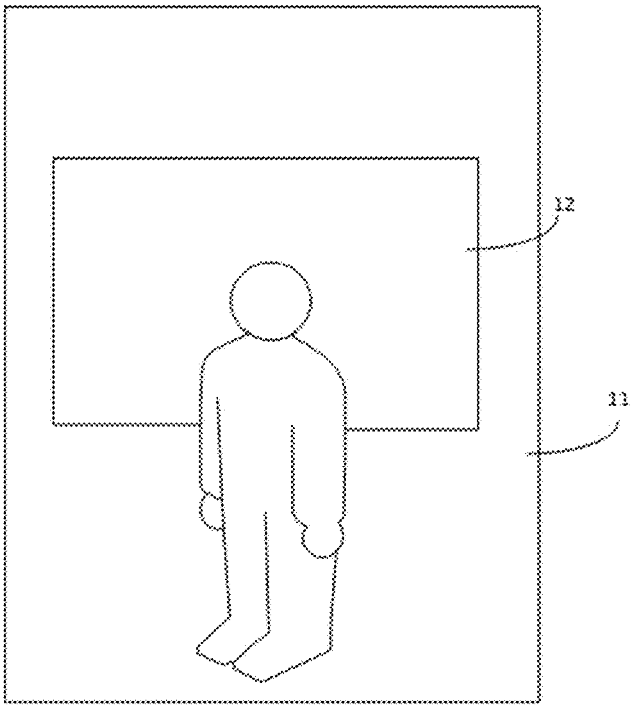
FIG. 1 is a schematic diagram of a live broadcast picture shown in an illustrative embodiment.

FIG. 1 is a schematic diagram of a live broadcast picture shown in an illustrative embodiment.

As shown in FIG. 1, a live broadcast picture 11 can be displayed on a client side, and there exists a TV 12 in the live broadcast picture.

In order to display information, the TV 12 may be set in a live broadcast site, and live broadcast information may be displayed through the TV 12. However, there may be reflections on the TV, which may cause the live broadcast image unclear.

Figure 2:
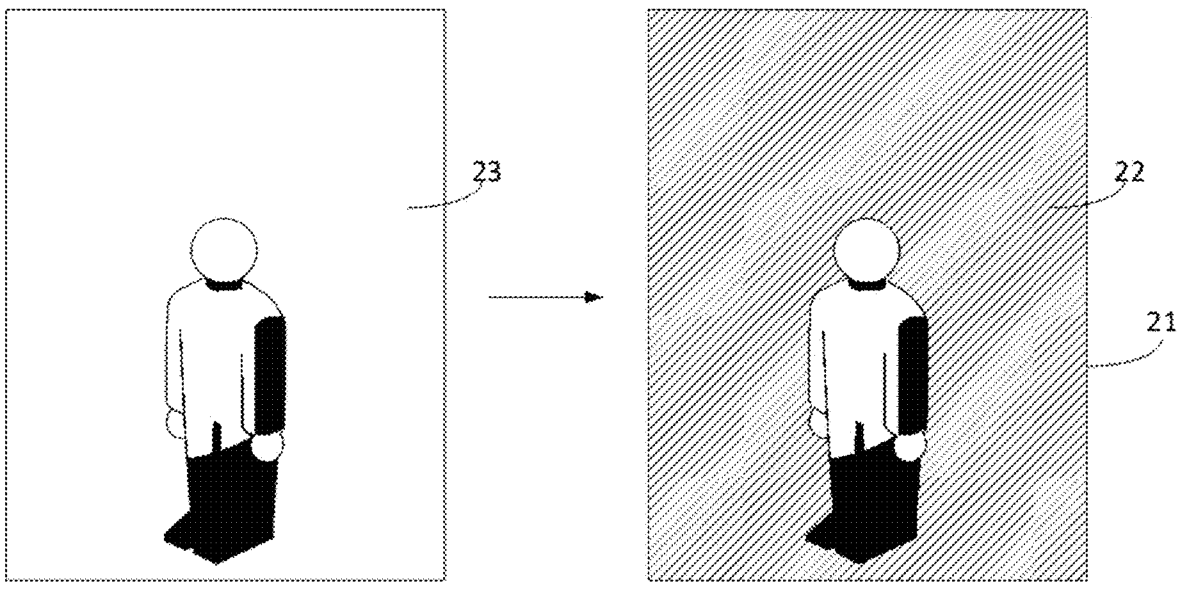
FIG. 2 is a schematic diagram of a live broadcast picture shown in another illustrative embodiment.

FIG. 2 is a schematic diagram of a live broadcast picture shown in another illustrative embodiment.

As shown in FIG. 2, a live broadcast picture 21 may be displayed on the client side, and there exists a background 22 (shown by oblique lines) in the live broadcast picture. For example, the background 22 may be a preset image.

A green screen 23 (shown by a blank region) can be set at the live broadcast site. Specifically, the green screen is set at the back of a host as a background, and the green screen in the picture is replaced by a preset image via software.

However, this method requires the preparation of live broadcast consumables, resulting in a higher cost for live broadcast.

In order to solve the above technical problems, in the solution provided by the present application, a basic background image of a preset scene can be shot in advance, and a background in a captured picture can be identified by using the basic background image, and then a preset background image can be used to accurately replace the background in the captured picture. This method does not need to set a background such as the green screen, and the TV on the live broadcast site, so that the cost of live broadcast is reduced, and the pictured would not be unclear due to the problem, such as, TV reflections.

Figure 3:
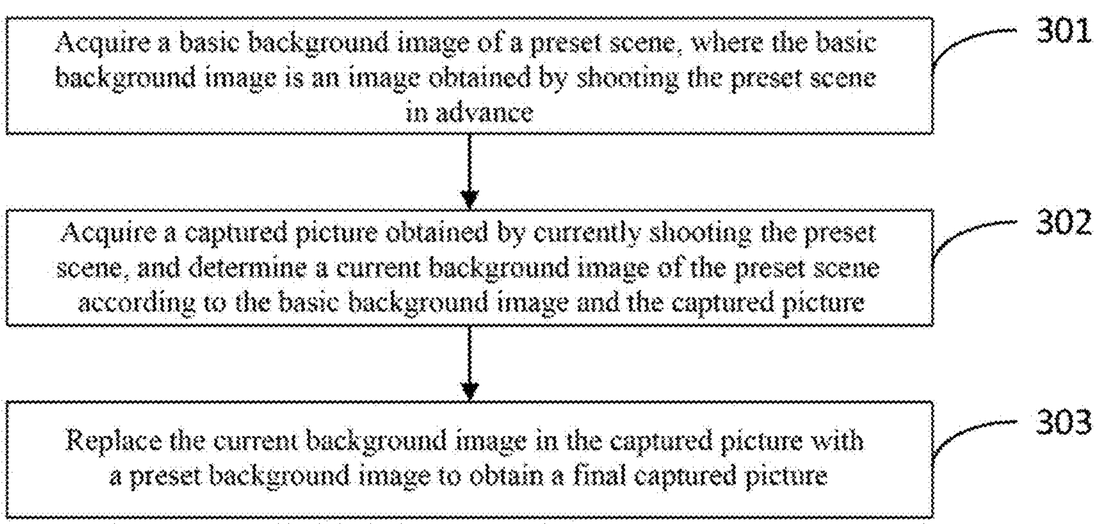
FIG. 3 is a schematic flowchart of a method for replacing a background in a picture shown in an illustrative embodiment of the present application.

FIG. 3 is a schematic flowchart of a method for replacing a background in a picture shown in an illustrative embodiment of the present application.

As shown in FIG. 3, the method for replacing the background in the picture provided by the present application includes:

step 301, acquire a basic background image of a preset scene, where the basic background image is an image obtained by shooting the preset scene in advance.

The method provided in the present application may be executed by an electronic device with computing capability.

In an implementation, the electronic device may be, for example, a computer, and the computer may be, for example, a backstage server that provides a live broadcast service.

In another implementation, the electronic device may be, for example, a mobile terminal, and the mobile terminal may serve as a live broadcast terminal of the host.

Specifically, the method provided in the present application may be set in the electronic device, so that the electronic device executes the method provided in the present application.

Furthermore, when the electronic device replaces a picture background, it can acquire the basic background image. The basic background image is an image obtained by capturing a preset scene in advance. For example, a user can shoot a scene where the live broadcast is located, and thus obtain the basic background image. Specifically, the basic background image can be shot from a shooting angle during the live broadcast.

For another example, the method provided by the present application can also perform background replacement on a video recorded in the preset scene, or perform background replacement on a picture shot in the preset scene.

In practical application, when the basic background image is captured, there, in the preset scene, may be only an environment where the live broadcast is located but without a character.

Figure 4:
FIG. 4 is a schematic diagram of a basic background image shown in an illustrative embodiment of the present application.

FIG. 4 is a schematic diagram of a basic background image shown in an illustrative embodiment of the present application.

As shown in FIG. 4, the basic background image can be shown in FIG. 4. The host can perform the live broadcast in this scene. Generally, the environment will not be changed during the live broadcast, so the background of the live broadcast picture will not be much different from the basic background image. Therefore, the background portion in the live broadcast picture can be identified based on the basic background image.

Step 302, acquire a captured picture obtained by currently shooting the preset scene, and determine a current background image of the preset scene according to the basic background image and the captured picture.

The electronic device can acquire the captured picture obtained by currently shooting the preset scene, and the captured picture may be shot in real time or in advance. The captured picture may be a frame in a video, or an image shot.

Since the captured picture is a picture obtained by shooting the preset scene, the captured picture includes image content in the basic background image. For example, if the host is performing the live broadcast in the preset scene, the captured picture includes the host and part of the basic background image.

Specifically, the captured picture is a picture in which the background needs to be replaced. Therefore, the electronic device can acquire the captured picture, and determine the current background image of the preset scene according to the basic background image and the captured picture.

Furthermore, the electronic device can compare the basic background image with the captured picture, so as to identify a portion, consistent with the basic background picture, in the captured picture, to obtain the current background image.

Step 303, replace the current background image in the captured picture with a preset background image to obtain a final captured picture.

In practical application, the user can also set the preset background image in advance. If the electronic device is a server, the user can upload the preset background image through a terminal; if the electronic device is a live broadcast client, the user can select an image in the live broadcast client as the preset background image.

The electronic device can use the selected preset background image to replace the current background image in the captured picture, so as to obtain the final captured picture. Specifically, a foreground image can be extracted from the captured picture by using the current background image, and the foreground image is stitched into the preset background image to obtain the final captured picture.

Specifically, the user can also replace the preset background image, so as to replace the background of the live broadcast during the live broadcast according to the needs. For example, when introducing item A, the user may select an image including introduction information of the item A as the preset background image, and when introducing item B, the user may select an image including introduction information of the item B as the preset background image. In this way, the user can adjust the background image for the live broadcast according to the user's needs.

If the electronic device is a server, the server may send the final captured picture with the updated background to each user terminal, so that the user can watch the final captured picture with the replaced background.

If the electronic device is a live broadcast terminal, the live broadcast terminal can send the final captured picture with the updated background to the server, and the server sends the final captured picture to the user terminal, so that the user can watch the final captured picture with the replaced background.

The method for replacing the background in the picture provided by the present application includes: acquiring a basic background image of a preset scene, where the basic background image is an image obtained by shooting the preset scene in advance; acquiring a captured picture obtained by currently shooting the preset scene, and determining a current background image of the preset scene according to the basic background image and the captured picture; replacing the current background image in the captured picture with a preset background image to obtain a final captured picture. In the method provided by the present application, the current background image in the currently captured picture can be identified by using the basic background image captured in advance, and then the preset background image can be used to replace the current background image in the captured picture. In this way, without setting a specific background apparatus in the preset scene, the background in the captured picture can be adjusted according to requirements, thereby improving flexibility of replacing the background in the captured picture.

Figure 5:
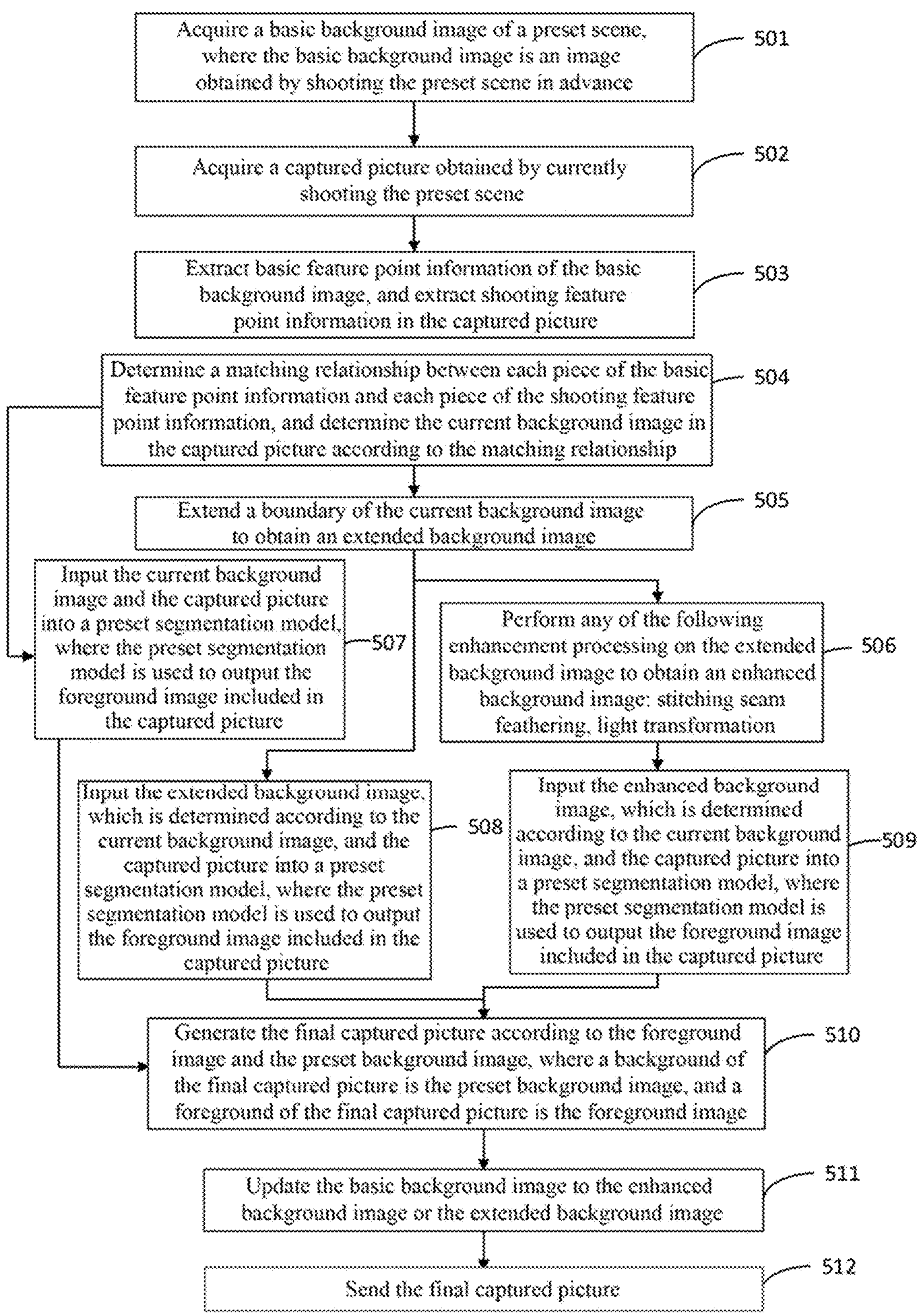
FIG. 5 is a schematic flowchart of a method for replacing a background in a picture shown in another illustrative embodiment of the present application.

FIG. 5 is a schematic flowchart of a method for replacing a background in a picture shown in another illustrative embodiment of the present application.

As shown in FIG. 5, the method for replacing the background in the picture provided by the present application includes:

Step 501, acquire a basic background image of a preset scene, where the basic background image is an image obtained by shooting the preset scene in advance.

The implementation and principle of step 501 are similar to those of step 301, which will not be repeated here.

Step 502, acquire a captured picture obtained by currently shooting the preset scene.

The manner of acquiring the captured picture in step 502 is similar to that in step 302, which will not be repeated here.

Step 503, extract basic feature point information of the basic background image, and extract shooting feature point information in the captured picture.

The electronic device can identify the current background image in the captured picture according to the basic background image. Specifically, feature point information in the basic background image and in the captured picture can be extracted respectively.

Specifically, the extracted basic feature point information can represent a feature of the basic background image, and the extracted shooting feature point information can represent a feature in the captured picture. The feature point information can be used to identify the portion in the captured picture which is consistent with the basic background image, and then the current background image is identified.

Furthermore, the electronic device can use a scale invariant feature transform (SIFT) method to extract the features in the basic background image and the captured picture, to obtain the basic feature point information in the basic background image, and the shooting feature point information in the captured picture.

Step 504, determine a matching relationship between each piece of the basic feature point information and each piece of the shooting feature point information, and determine the current background image in the captured picture according to the matching relationship.

In practical application, the electronic device can match the basic feature point information with the shooting feature point information, so as to determine the matching relationship between each piece of basic feature point information and each piece of shooting feature point information. For example, basic feature point information A1 is matched with shooting feature point information A2, and basic feature point information B1 is matched with shooting feature point information B2.

If the feature point information is extracted according to the SIFT method, each piece of feature point information extracted can represent a stable local feature of the image, and then a stable matching result can be obtained according to the SIFT feature point.

Specifically, the electronic device may determine the current background image in the captured picture according to the matching relationship.

Furthermore, the electronic device can determine a positional corresponding relationship between the basic background image and the captured picture according to the matching relationship between each piece of basic feature point information and each piece of shooting feature point information. For example, pixel point P1 of the basic background image is matched with pixel point P2 in the captured picture. It can be considered that the pixel point P2 is the background portion, and there is a corresponding relationship between the positions of these two pixel points.

In practical application, the electronic device can determine the background portion in the captured picture according to the positional corresponding relationship between the basic background image and the captured picture, and can stitch the background portion in the captured picture and the basic background picture to obtain the current background image of the preset scene in the captured picture.

A camera position at a time of currently shooting the preset scene may not be exactly the same as a camera position at a time of capturing the basic background image, so the background portion in the captured picture may not completely coincide with the basic background image. Therefore, the basic background image can be stitched with the captured picture, to obtain a larger background image.

For example, if the camera position at the time of currently shooting the preset scene is higher than the camera position at the time of capturing the basic background image, image content of an upper part of the captured picture can be stitched onto the basic background image, to obtain a larger stitched background image.

Figure 6:
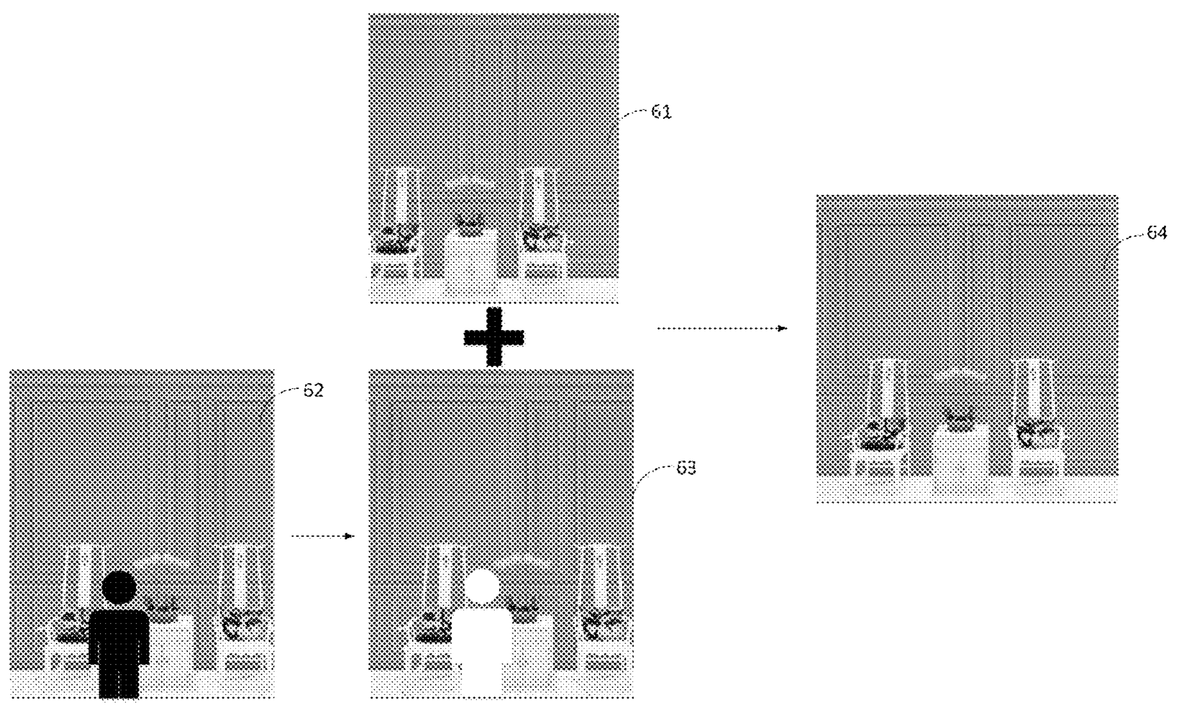
FIG. 6 is a schematic diagram of a background image shown in an illustrative embodiment of the present application.

FIG. 6 is a schematic diagram of a background image shown in an illustrative embodiment of the present application.

As shown in FIG. 6, a basic background image is shown as 61, and a background portion 63 is identified in a captured picture 62, and the background portion 63 and the basic background image 61 can be stitched together to obtain a current background image 64.

Step 507 and step 510 may be executed after step 504, so as to generate a final captured picture directly according to the current background image.

Step 505, extend a boundary of the current background image to obtain an extended background image.

In an implementation, the solution provided in the present application may also extend the boundary of the current background image to obtain an extended background image.

In this implementation, when a camera angle changes, the method provided by the present application can also accurately identify the background portion in the captured picture according to the extended background image.

In this implementation, the preset background image may be used to replace the extended background image in the captured picture according to the extended background image, to obtain the final captured picture. Specifically, the background portion can be identified in the captured picture according to the extended background image, so as to extract the foreground image, and then the foreground image is used to generate the final captured picture.

Step 508 and step 510 may be executed after step 505, so as to generate the final captured picture according to the extended background image.

Step 506, perform any of the following enhancement processing on the extended background image to obtain an enhanced background image: stitching seam feathering, light transformation.

In an implementation, the method provided in the present application can further perform enhancement processing on the extended background image to obtain an enhanced background image, so that the enhanced background image is more similar to the background portion in the captured picture. Therefore, the background portion can be accurately identified from the captured picture according to the enhanced background image.

In this implementation, the preset background image may be used to replace the enhanced background image in the captured picture according to the enhanced background image, to obtain the final captured picture. Specifically, the background portion can be identified from the captured picture according to the enhanced background image, so as to extract the foreground image, and then the foreground image is used to generate the final captured picture.

Specifically, the stitching seam feathering processing can be performed on the extended background image, so that the position transition of the stitching seam in the image is more natural. It is also possible to perform light change processing on the extended background image, so as to increase brightness in the image and enhance a texture feature in the image.

Specifically, the electronic device may determine a foreground image included in the captured picture according to the current background image and the captured picture. Specifically, the foreground image in the captured picture may be directly extracted according to the current background image, or the foreground image in the captured picture may be extracted by using the extended background image determined according to the current background image. The foreground image in the captured picture may also be extracted by using the enhanced background image determined according to the current background image.

Step 509 and step 510 may be executed after step 506, so as to generate the final captured picture according to the enhanced background image.

Step 507, input the current background image and the captured picture into a preset segmentation model, where the preset segmentation model is used to output the foreground image included in the captured picture.

The electronic device can set a model, which can output the foreground image included in the captured picture according to the background image and the captured picture. The model can be obtained through pre-training. For example, a preset model can be built in advance and then trained to obtain the preset segmentation model. A feature extraction network in the preset model can be, for example, a mobilenet network (mobile neural network).

Using the mobilenet network to build the preset model can make a size of the model smaller, so that the model can be applied to the mobile terminal side.

In an implementation, the electronic device may input the current background image and the captured image into the preset segmentation model, and the preset segmentation model can output the foreground image.

Step 508, input the extended background image, which is determined according to the current background image, and the captured picture into a preset segmentation model, where the preset segmentation model is used to output the foreground image included in the captured picture.

The electronic device can set a model, which can output the foreground image included in the captured picture according to the background image and the captured picture. The model can be obtained through pre-training. For example, a preset model can be built in advance and then trained to obtain the preset segmentation model. A feature extraction network in the preset model can be, for example, a mobilenet network.

Using the mobilenet network to build the preset model can make a size of the model smaller, so that the model can be applied to the mobile terminal side.

In an implementation, the electronic device may input the extended background image and the captured image into the preset segmentation model, and the preset segmentation model can output the foreground image.

Step 509, input the enhanced background image, which is determined according to the current background image, and the captured picture into a preset segmentation model, where the preset segmentation model is used to output the foreground image included in the captured picture.

The electronic device can set a model, which can output the foreground image included in the captured picture according to the background image and the captured picture. The model can be obtained through pre-training. For example, a preset model can be built in advance and then trained to obtain the preset segmentation model. A feature extraction network in the preset model can be, for example, a mobilenet network.

Using the mobilenet network to build the preset model can make a size of the model smaller, so that the model can be applied to the mobile terminal side.

In an implementation, the electronic device may input the enhanced background image and the captured image into the preset segmentation model, and the preset segmentation model can output the foreground image.

Step 510: generate the final captured picture according to the foreground image and the preset background image, where a background of the final captured picture is the preset background image, and a foreground of the final captured picture is the foreground image.

Specifically, the electronic device may fuse the foreground image and the acquired preset background image to obtain the final captured picture. In this way, the background in the picture can be shot better, and on basis of the method of the present application, the background portion in the captured picture can be identified accurately, and then an accurate foreground image can be extracted, so that a clear final captured picture can be obtained.

Figure 7:
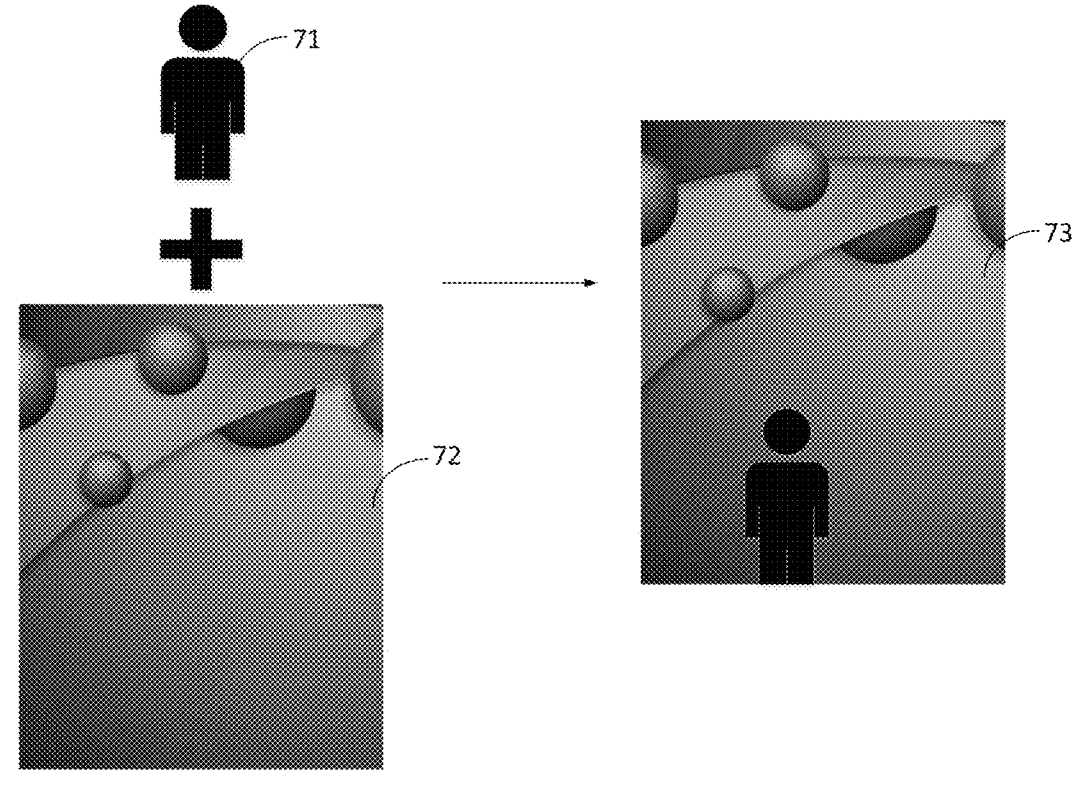
FIG. 7 is a schematic diagram of generation of a final captured picture shown in an illustrative embodiment of the present application.

FIG. 7 is a schematic diagram of generation of a final captured picture shown in an illustrative embodiment of the present application.

As shown in FIG. 7, the electronic device can extract a foreground image 71 from the captured picture, and then can fuse the foreground image 71 with a preset background image 72, by taking the foreground image 71 as the foreground, and taking the preset background image 72 as the background, to obtain a final captured picture 73.

In an implementation, the method provided by the present application may further include:

step 511, update the basic background image to the enhanced background image or the extended background image.

When continuing to replace the background for the captured picture, the electronic device can perform the processing based on the updated basic background image. Since both the extended background image and the enhanced background image are images extended based on the current shooting angle, when the camera rotates, based on the updated basic background image, the background portion can still be accurately identified from the captured picture, and an accurate foreground image can be extracted.

Step 512, send the final captured picture.

The method provided by the embodiment can be implemented by a live broadcast terminal, which can replace the background portion in the captured picture captured by the live broadcast terminal with the preset background image selected by the user, so as to achieve the effect of background replacement.

Specifically, after the live broadcast terminal replaces the background in the captured picture, it can upload the obtained final captured picture to the server, so that the server sends the final captured picture to each user terminal, and users can watch the final captured picture through their respective terminals.

Figure 8:
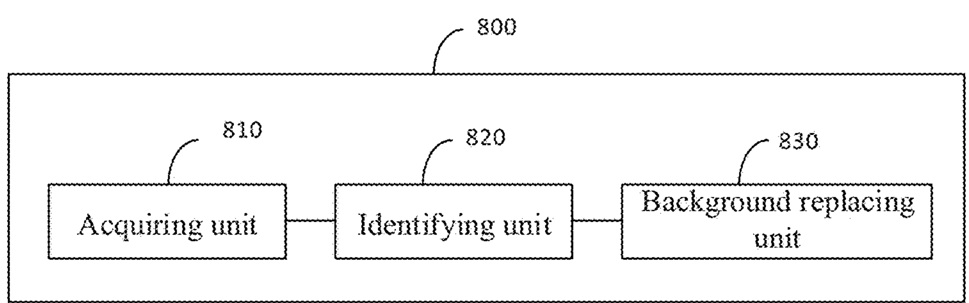
FIG. 8 is a schematic structural diagram of an apparatus for replacing a background in a picture shown in an illustrative embodiment of the present application.

FIG. 8 is a schematic structural diagram of an apparatus for replacing a background in a picture shown in an illustrative embodiment of the present application.

As shown in FIG. 8, an apparatus 800 for replacing the background in the picture provided by the present application includes:

an acquiring unit 810, configured to acquire a basic background image of a preset scene, where the basic background image is an image obtained by shooting the preset scene in advance;

where the acquiring unit 810 is further configured to acquire a captured picture obtained by currently shooting the preset scene;

an identifying unit 820, configured to determine a current background image of the preset scene according to the basic background image and the captured picture; and a background replacing unit 830, configured to replace the current background image in the captured picture with a preset background image to obtain a final captured picture.

The apparatus for replacing the background in the picture provided by the present application includes: an acquiring unit, configured to acquire a basic background image of a preset scene, where the basic background image is an image obtained by shooting the preset scene in advance; where the acquiring unit is further configured to acquire a captured picture obtained by currently shooting the preset scene; an identifying unit, configured to determine a current background image of the preset scene according to the basic background image and the captured picture; a background replacing unit, configured to replace the current background image in the captured picture with a preset background image to obtain a final captured picture. In the apparatus provided by the present application, the current background image in the currently captured picture can be identified by using the basic background image captured in advance, and then the preset background image can be used to replace the current background image in the captured picture. In this way, without setting a specific background apparatus in the preset scene, the background in the captured picture can be adjusted according to requirements, thereby improving flexibility of replacing the background in the captured picture.

Figure 9:
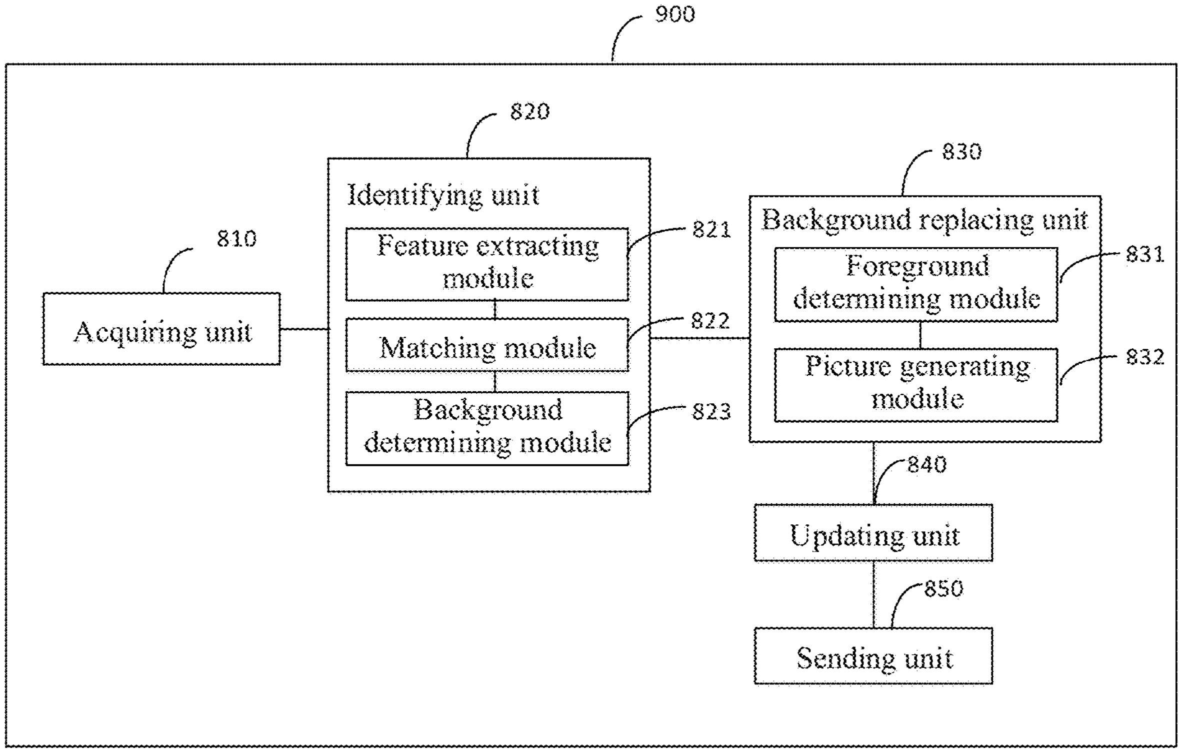
FIG. 9 is a schematic structural diagram of an apparatus for replacing a background in a picture shown in another illustrative embodiment of the present application.

FIG. 9 is a schematic structural diagram of an apparatus for replacing a background in a picture shown in another illustrative embodiment of the present application.

As shown in FIG. 9, on the basis of the above-mentioned embodiments, in an apparatus 900 for replacing a background in a picture provided by the present application, in an implementation manner, the identifying unit 820 includes:

a feature extracting module 821, configured to extract basic feature point information of the basic background image, and extract shooting feature point information in the captured picture;

a matching module 822, configured to determine a matching relationship between each piece of the basic feature point information and each piece of the shooting feature point information;

a background determining module 823, configured to determine the current background image in the captured picture according to the matching relationship.

In an implementation, the background determining module 823 is specifically configured to:

stitch a background portion in the captured picture and the basic background image according to the matching relationship, to obtain the current background image of the preset scene in the captured picture.

In an implementation, the background determining module 823 is further configured to:

extend a boundary of the current background image to obtain an extended background image; and correspondingly, the background replacing unit 830 is specifically configured to:

replace the extended background image in the captured picture with the preset background image according to the extended background image, to obtain the final captured picture.

In an implementation, the background replacing unit 830 is specifically configured to:

perform any of the following enhancement processing on the extended background image to obtain an enhanced background image:

stitching seam feathering, light transformation; and correspondingly, the background replacing unit 830 is specifically configured to:

replace the extended background image in the captured picture with the preset background image according to the enhanced background image, to obtain the final captured picture.

In an implementation, the background replacing unit 830 includes:

a foreground determining module 831, configured to determine a foreground image included in the captured picture according to the current background image and the captured picture; and a picture generating module 832, configured to generate the final captured picture according to the foreground image and the preset background image, where a background of the final captured picture is the preset background image, and a foreground of the final captured picture is the foreground image.

In an implementation, the foreground determining module 831 is specifically configured to:

input the current background image and the captured picture into a preset segmentation model, where the preset segmentation model is used to output the foreground image included in the captured picture;

or, input the extended background image, which is determined according to the current background image, and the captured picture into a preset segmentation model, where the preset segmentation model is used to output the foreground image included in the captured picture;

or, input the enhanced background image, which is determined according to the current background image, and the captured picture into a preset segmentation model, where the preset segmentation model is used to output the foreground image included in the captured picture.

In an implementation, the apparatus further includes an updating unit 840, configured to:

update the basic background image to the enhanced background image or the extended background image.

In an implementation, the apparatus further includes a sending unit 850, configured to:

send the final captured picture.

The device provided in this embodiment can be used to implement the technical solutions of the above method embodiments, and the implementation principles and technical effects thereof are similar, which will not be repeated here in this embodiment.

The embodiment further provides a computer program product, including a computer program, where when the computer program is executed by a processor, the method for replacing a background in a picture according to any one of the above aspects is implemented.

The embodiment further provides a computer program, where when the computer program is executed by a processor, the method for replacing a background in a picture according to any one of the above aspects is implemented.

Figure 10:
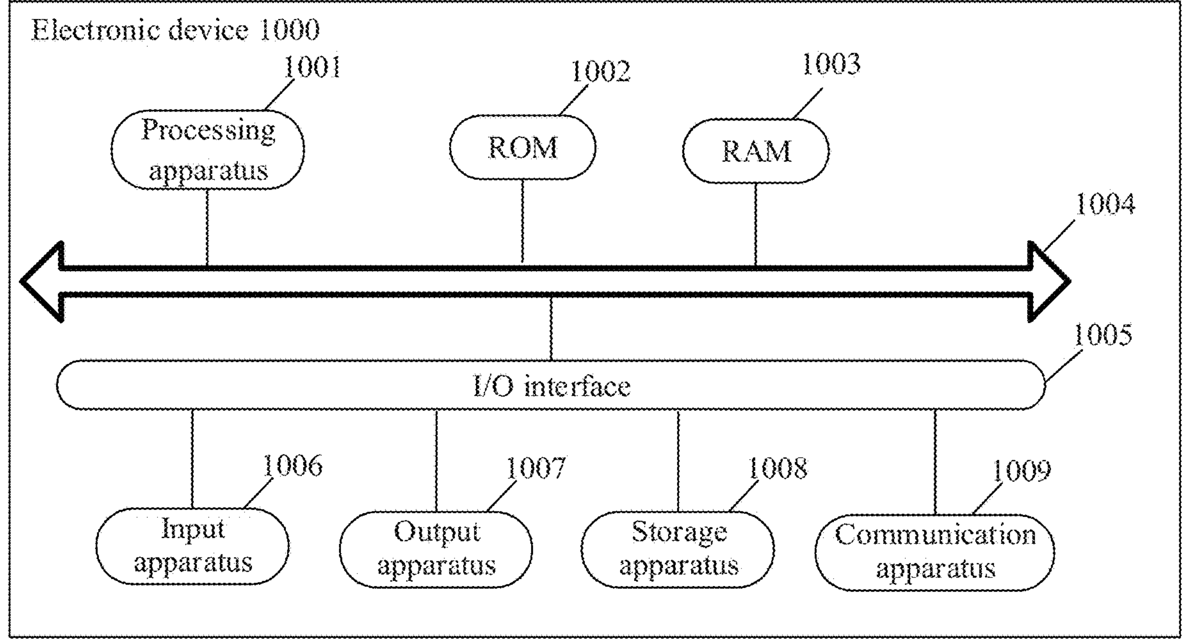
FIG. 10 is a schematic hardware structural diagram of an electronic device provided by an embodiment of the present disclosure.

Referred to FIG. 10, which shows a schematic structural diagram of an electronic device 1000 adaptable to implementing the embodiments of the present disclosure. The electronic device 1000 may be a terminal device or a server. The terminal device may include, but is not limited to, mobile terminals, such as a mobile phone, a notebook computer, a digital broadcast receiver, a personal digital assistant (PDA), a portable android device (PAD), a portable media player (PMP), a vehicle-mounted terminal (for example, vehicle-mounted navigation terminal), and fixed terminals, such as a digital TV, a desktop computer, etc. The electronic device shown in FIG. 10 is only an example, and should not bring any limitation to the function and usage scope of the embodiments of the present disclosure.

As shown in FIG. 10, the electronic device 1000 may include a processing apparatus 1001 (such as a central processor, a graphics processor, etc.), which may execute suitable actions and processing according to programs stored in a read-only memory (ROM) 1002 or programs loaded into a random access memory (RAM) 1003 from a storage apparatus 1008. In the RAM 1003, various programs and data required for the operation of the electronic device 1000 are also stored. The processing apparatus 1001, the ROM 1002, and the RAM 1003 are connected to each other through a bus 1004. An input/output (I/O) interface 1005 is also connected to the bus 1004.

Generally, the following apparatuses can be connected to the I/O interface 1005: an input apparatus 1006 including, such as a touch screen, a touch pad, a keyboard, a mouse, a camera, a microphone, an accelerometer, a gyroscope, etc.; an output apparatus 1007 including, such as a liquid crystal display (LCD), a speaker, a vibrator, etc.; a storage apparatus 1008 including, such as a magnetic tape, a hard disk, etc.; and a communication apparatus 1009. The communication apparatus 1009 allow the electronic device 1000 to perform wireless or wired communication with other devices to exchange data. Although FIG. 10 shows the electronic device 1000 having various apparatuses, it should be understood that not all of the illustrated apparatuses are required to be implemented or provided. More or fewer apparatuses may alternatively be implemented or provided.

In particular, according to an embodiment of the present disclosure, the process described above with reference to the flowchart may be implemented as a computer software program. For example, an embodiment of the present disclosure includes a computer program product, which includes a computer program carried on a computer-readable medium, and the computer program contains program codes for executing the method shown in the flowchart. In such an embodiment, the computer program may be downloaded and installed from the network through the communication apparatus 1009, or installed from the storage apparatus 1008, or installed from the ROM 1002. When the computer program is executed by the processing apparatus 1001, the above-mentioned functions defined in the method of the embodiment of the present disclosure are executed.

It should be noted that the above-mentioned computer-readable medium in the present disclosure may be a computer-readable signal medium or a computer-readable storage medium, or any combination thereof. The computer-readable storage medium may be, for example, but not limited to, an electrical, a magnetic, an optical, an electromagnetic, an infrared, or a semiconductor system, apparatus, or device, or any combination thereof. More specific examples of computer-readable storage media may include, but are not limited to, an electrical connection based on one or more wires, a portable computer disk, a hard disk, a random access memory (RAM), a read-only memory (ROM), an erasable programmable read-only memory (EPROM) or a flash memory, an optical fiber, a portable compact disk read-only memory (CD-ROM), an optical storage device, a magnetic storage device, or any suitable combination of the above. In the present disclosure, a computer-readable storage medium may be any tangible medium that includes or stores programs, and the programs may be used by or in combination with an instruction execution system, apparatus, or device. In the present disclosure, a computer-readable signal medium may include a data signal propagated in a baseband or as a part of a carrier wave, and a computer-readable program code is carried therein. This propagated data signal can take many forms, including but not limited to an electromagnetic signal, an optical signal, or any suitable combination thereof. The computer readable signal medium may also be any computer readable medium other than the computer readable storage medium, the computer readable signal medium may send, propagate, or transmit the program used by or in combination with the instruction execution system, apparatus, or device. The program code included on the computer-readable medium can be transmitted by any suitable medium, including but not limited to: an electrical wire, an optical cable, an RF (Radio Frequency), etc., or any suitable combination thereof.

The above-mentioned computer-readable medium may be included in the above-mentioned electronic device; or may exist alone without being assembled into the electronic device.

The above computer-readable medium carries one or more programs, and when the foregoing one or more programs are executed by the electronic device, causes the electronic device to execute the method shown in the foregoing embodiments.

The computer program code used to perform the operations of the present disclosure can be written in one or more programming languages or a combination thereof. The above-mentioned programming languages include object-oriented programming languages—such as Java, Smalltalk, C++, and also include conventional procedural programming languages-such as "C" language or similar programming language. The program code may be executed entirely on a computer of a user, partly on a computer of a user, executed as an independent software package, partly executed on a computer of a user and partly executed on a remote computer, or entirely executed on a remote computer or server. In the case of a remote computer, the remote computer can be connected to the user's computer through any kind of network, including a local area network (LAN) or a wide area network (WAN), or it can be connected to an external computer (for example, connected via the Internet using an Internet service provider).

The flowcharts and block diagrams in the accompanying drawings illustrate possible implemented architecture, functions, and operations of the system, method, computer program and computer program product according to the embodiments of the present disclosure. In this point, each block in the flowchart or block diagram may represent a module, a program segment, or a part of codes, and the module, the program segment, or the part of codes contains one or more executable instructions for implementing a designated logical function. It should also be noted that, in some alternative implementations, the functions marked in the blocks may also occur in a different order from the order marked in the drawings. For example, two blocks shown one after another may actually be executed substantially in parallel, or sometimes may be executed in a reverse order, which depends on the functions involved. It should also be noted that each block in the block diagram and/or flowchart, and the combination of the blocks in the block diagram and/or flowchart, can be implemented by a dedicated hardware-based system that performs the specified functions or operations, or it can be realized by a combination of dedicated hardware and computer instructions.

The units involved in the embodiments described in the present disclosure may be implemented in software or hardware. Where a name of a unit does not constitute a limitation on the unit itself in one case. For example, a first acquiring unit may also be described as "a unit that acquires at least two Internet Protocol addresses".

The functions described herein above may be performed at least in part by one or more hardware logic components. For example, non-restrictively, exemplary types of hardware logic components that may be used include: a field programmable gate array (FPGA), an application specific integrated circuit (ASIC), an application specific standard product (ASSP), a system on chip (SOC), a complex programmable logic device (CPLD), etc.

In the context of the present disclosure, a machine-readable medium may be a tangible medium, which may include or store a program for use by or in combination with an instruction execution system, apparatus or device. The machine-readable medium may be a machine-readable signal medium or a machine-readable storage medium. The machine-readable medium may include, but is not limited to, an electronic, a magnetic, an optical, an electromagnetic, an infrared, or a semiconductor system, apparatus, or device, or any suitable combination thereof. More specific examples of the machine-readable storage media may include an electrically connected portable computer disk based on one or more wires, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In a first aspect, according to one or more embodiments of the present disclosure, a method for replacing a background in a picture is provided, including:

acquiring a basic background image of a preset scene, where the basic background image is an image obtained by shooting the preset scene in advance;

acquiring a captured picture obtained by currently shooting the preset scene, and determining a current background image of the preset scene according to the basic background image and the captured picture; and replacing the current background image in the captured picture with a preset background image to obtain a final captured picture.

According to one or more embodiments of the present disclosure, the determining the current background image of the preset scene according to the basic background image and the captured picture includes:

extracting basic feature point information of the basic background image, and extracting shooting feature point information in the captured picture; and determining a matching relationship between each piece of the basic feature point information and each piece of the shooting feature point information, and determining the current background image in the captured picture according to the matching relationship.

According to one or more embodiments of the present disclosure, the determining the current background image in the captured picture according to the matching relationship includes:

stitching a background portion in the captured picture and the basic background image according to the matching relationship, to obtain the current background image of the preset scene in the captured picture.

According to one or more embodiments of the present disclosure, the method further includes:

extending a boundary of the current background image to obtain an extended background image; and replacing the extended background image in the captured picture with the preset background image correspondingly according to the extended background image, to obtain the final captured picture.

According to one or more embodiments of the present disclosure, the method further includes:

performing any of the following enhancement processing on the extended background image to obtain an enhanced background image:

stitching seam feathering, light transformation; and replacing the extended background image in the captured picture with the preset background image correspondingly according to the enhanced background image, to obtain the final captured picture.

According to one or more embodiments of the present disclosure, the replacing the current background image in the captured picture with the preset background image to obtain the final captured picture includes:

determining a foreground image included in the captured picture according to the current background image and the captured picture; and generating the final captured picture according to the foreground image and the preset background image, where a background of the final captured picture is the preset background image, and a foreground of the final captured picture is the foreground image.

According to one or more embodiments of the present disclosure, the determining the foreground image included in the captured picture according to the current background image and the captured picture includes:

inputting the current background image and the captured picture into a preset segmentation model, where the preset segmentation model is used to output the foreground image included in the captured picture;

or, inputting the extended background image, which is determined according to the current background image, and the captured picture into a preset segmentation model, where the preset segmentation model is used to output the foreground image included in the captured picture;

or, inputting the enhanced background image, which is determined according to the current background image, and the captured picture into a preset segmentation model, where the preset segmentation model is used to output the foreground image included in the captured picture.

According to one or more embodiments of the present disclosure, the method further includes:

updating the basic background image to the enhanced background image or the extended background image.

According to one or more embodiments of the present disclosure, the method further includes:

sending the final captured picture.

In a second aspect, according to one or more embodiments of the present disclosure, an apparatus for replacing a background in a picture is provided, including:

an acquiring unit, configured to acquire a basic background image of a preset scene, where the basic background image is an image obtained by shooting the preset scene in advance;

where the acquiring unit is further configured to acquire a captured picture obtained by currently shooting the preset scene;

an identifying unit, configured to determine a current background image of the preset scene according to the basic background image and the captured picture; and a background replacing unit, configured to replace the current background image in the captured picture with a preset background image to obtain a final captured picture.

According to one or more embodiments of the present disclosure, the identifying unit includes:

a feature extracting module, configured to extract basic feature point information of the basic background image, and extracting shooting feature point information in the captured picture;

a matching module, configured to determine a matching relationship between each piece of the basic feature point information and each piece of the shooting feature point information; and a background determining module, configured to determine the current background image in the captured picture according to the matching relationship.

According to one or more embodiments of the present disclosure, the background determining module is specifically configured to:

stitch a background portion in the captured picture and the basic background image according to the matching relationship, to obtain the current background image of the preset scene in the captured picture.

According to one or more embodiments of the present disclosure, the background determining module is further configured to:

extend a boundary of the current background image to obtain an extended background image; and correspondingly, the background replacing unit is specifically configured to:

replace the extended background image in the captured picture with the preset background image according to the extended background image, to obtain the final captured picture.

According to one or more embodiments of the present disclosure, the background replacing module is specifically configured to:

perform any of the following enhancement processing on the extended background image to obtain an enhanced background image:

stitching seam feathering, light transformation; and correspondingly, the background replacing unit is specifically configured to:

replace the extended background image in the captured picture with the preset background image according to the enhanced background image, to obtain the final captured picture.

According to one or more embodiments of the present disclosure, the background replacing module includes:

a foreground determining module, configured to determine a foreground image included in the captured picture according to the current background image and the captured picture; and a picture generating module, configured to generate the final captured picture according to the foreground image and the preset background image, where a background of the final captured picture is the preset background image, and a foreground of the final captured picture is the foreground image.

According to one or more embodiments of the present disclosure, the foreground determining module is specifically configured to:

input the current background image and the captured picture into a preset segmentation model, and the preset segmentation model is used to output the foreground image included in the captured picture;

or, input the extended background image, which is determined according to the current background image, and the captured picture into a preset segmentation model, where the preset segmentation model is used to output the foreground image included in the captured picture;

or, input the enhanced background image, which is determined according to the current background image, and the captured picture into a preset segmentation model, where the preset segmentation model is used to output the foreground image included in the captured picture.

According to one or more embodiments of the present disclosure, the apparatus further includes an updating unit, configured to:

update the basic background image to the enhanced background image or the extended background image.

According to one or more embodiments of the present disclosure, the apparatus further includes a sending unit, configured to:

send the final captured picture to a server.

In a third aspect, according to one or more embodiments of the present disclosure, an electronic device is provided, including: at least one processor and a memory;

where the memory stores a computer-executed instruction;

the at least one processor executes the computer-executed instruction stored in the memory, to cause the at least one processor to execute the method for replacing a background in a picture according to the above first aspect and any possible methods of the first aspect.

In a fourth aspect, according to one or more embodiments of the present disclosure, a computer-readable storage medium is provided. The computer-readable storage medium has a computer-executed instruction stored thereon, and when a processor executes the computer-executed instruction, the method for replacing a background in a picture according to the above first aspect and any possible methods of the first aspect is implemented.

In a fifth aspect, according to one or more embodiments of the present disclosure, a computer program product is provided, including a computer program, where when the computer program is executed by a processor, the method for replacing a background in a picture according to any of the above aspects is implemented.

In a sixth aspect, according to one or more embodiments of the present disclosure, a computer program is provided, where when the computer program is executed by a processor, the method for replacing a background in a picture according to any of the above aspects is implemented.

The above description is only a preferred embodiment of the present disclosure and an explanation of the applied technical principles. Those skilled in the art should understand that the disclosure scope involved in the present disclosure is not limited to the technical solutions formed by the specific combination of the above technical features, and should also cover other technical solutions formed by the above technical features or equivalent features without departing from the above disclosed concept. For example, the above-mentioned features and the technical features disclosed in the present disclosure (but not limited to) having similar functions are replaced with each other to form a technical solution.

In addition, although each operation is described in a specific order, this should not be understood as requiring these operations to be performed in the specific order or in a sequential order shown. Under certain circumstances, multitasking and parallel processing may be advantageous. Similarly, although several specific implementation details are included in the above discussion, these should not be interpreted as limiting the scope of the present disclosure. Certain features that are described in the context of separate embodiments can also be implemented in combination in a single embodiment. On the contrary, various features described in the context of a single embodiment can also be implemented in multiple embodiments individually or in any suitable sub-combination.

Although the subject matter has been described in language specific to a structural feature and/or a logical action of the method, it should be understood that the subject matter defined in the appended claims is not necessarily limited to the specific features or actions described above. On the contrary, the specific features and actions described above are only illustrative forms for implementing the claims.

The invention claimed is:

1. A method for replacing a background in a picture, comprising:

acquiring a basic background image of a preset scene, wherein the basic background image is an image obtained by shooting the preset scene in advance;

acquiring a captured picture obtained by currently shooting the preset scene, and determining a current background image of the preset scene according to the basic background image and the captured picture; and replacing the current background image in the captured picture with a preset background image to obtain a final captured picture, wherein the determining the current background image of the preset scene according to the basic background image and the captured picture comprises:

extracting basic feature point information of the basic background image, and extracting shooting feature point information in the captured picture; and determining a matching relationship between each piece of the basic feature point information and each piece of the shooting feature point information, and determining the current background image in the captured picture according to the matching relationship, wherein the determining the current background image in the captured picture according to the matching relationship comprises:

stitching a background portion in the captured picture and the basic background image according to the matching relationship, to obtain the current background image of the preset scene in the captured picture, wherein the method further comprises:

extending a boundary of the current background image to obtain an extended background image; and replacing the extended background image in the captured picture with the preset background image correspondingly according to the extended background image, to obtain the final captured picture, wherein the method further comprises:

performing any of the following enhancement processing on the extended background image to obtain an enhanced background image:

stitching seam feathering, light transformation; and replacing the enhanced background image in the captured picture with the preset background image correspondingly according to the enhanced background image, to obtain the final captured picture, and wherein the extended background image and the enhanced background image are images extended based on a current shooting angle.

2. The method according to claim 1, wherein the replacing the current background image in the captured picture with the preset background image to obtain the final captured picture comprises:

determining a foreground image comprised in the captured picture according to the current background image and the captured picture; and generating the final captured picture according to the foreground image and the preset background image, wherein a background of the final captured picture is the preset background image, and a foreground of the final captured picture is the foreground image.

3. The method according to claim 2, wherein the determining the foreground image comprised in the captured picture according to the current background image and the captured picture comprises:

inputting the current background image and the captured picture into a preset segmentation model, wherein the preset segmentation model is used to output the foreground image comprised in the captured picture;

or, inputting the extended background image, which is determined according to the current background image, and the captured picture into a preset segmentation model, wherein the preset segmentation model is used to output the foreground image comprised in the captured picture;

or, inputting the enhanced background image, which is determined according to the current background image, and the captured picture into a preset segmentation model, wherein the preset segmentation model is used to output the foreground image comprised in the captured picture.

4. The method according to claim 1, further comprising: updating the basic background image to the enhanced background image or the extended background image.

5. The method according to claim 1, further comprising: sending the final captured picture.

6. An apparatus for replacing a background in a picture, comprising:

at least one processor, and a memory communicatively connected to the at least one processor; wherein, the memory stores instructions executable by the at least one processor, and the instructions are executed by the at least one processor, so that the at least one processor is configured to:

acquire a basic background image of a preset scene, wherein the basic background image is an image obtained by shooting the preset scene in advance;

acquire a captured picture obtained by currently shooting the preset scene;

determine a current background image of the preset scene according to the basic background image and the captured picture; and replace the current background image in the captured picture with a preset background image to obtain a final captured picture, wherein the at least one processor is further configured to:

extract basic feature point information of the basic background image, and extract shooting feature point information in the captured picture; and determine a matching relationship between each piece of the basic feature point information and each piece of the shooting feature point information, and determine the current background image in the captured picture according to the matching relationship, wherein the at least one processor is further configured to:

stitch a background portion in the captured picture and the basic background image according to the matching relationship, to obtain the current background image of the preset scene in the captured picture, wherein the at least one processor is further configured to:

extend a boundary of the current background image to obtain an extended background image; and replace the extended background image in the captured picture with the preset background image correspondingly according to the extended background image, to obtain the final captured picture, wherein the at least one processor is further configured to:

perform any of the following enhancement processing on the extended background image to obtain an enhanced background image:

stitching seam feathering, light transformation; and replace the enhanced background image in the captured picture with the preset background image correspondingly according to the enhanced background image, to obtain the final captured picture, and wherein the extended background image and the enhanced background image are images extended based on a current shooting angle.

7. The apparatus according to claim 6, wherein the at least one processor is configured to:

determine a foreground image comprised in the captured picture according to the current background image and the captured picture; and generate the final captured picture according to the foreground image and the preset background image, wherein a background of the final captured picture is the preset background image, and a foreground of the final captured picture is the foreground image.

8. The apparatus according to claim 7, wherein the at least one processor is configured to:

input the current background image and the captured picture into a preset segmentation model, wherein the preset segmentation model is used to output the foreground image comprised in the captured picture;

or, input the extended background image, which is determined according to the current background image, and the captured picture into a preset segmentation model, wherein the preset segmentation model is used to output the foreground image comprised in the captured picture;

or, input the enhanced background image, which is determined according to the current background image, and the captured picture into a preset segmentation model, wherein the preset segmentation model is used to output the foreground image comprised in the captured picture.

9. The apparatus according to claim 6, wherein the at least one processor is configured to:

send the final captured picture.

10. A non-transitory computer-readable storage medium, wherein the computer-readable storage medium has a computer-executed instruction stored thereon, and when a processor executes the computer-executed instruction, the processor executes steps of:

acquiring a basic background image of a preset scene, wherein the basic background image is an image obtained by shooting the preset scene in advance;

acquiring a captured picture obtained by currently shooting the preset scene, and determining a current background image of the preset scene according to the basic background image and the captured picture; and replacing the current background image in the captured picture with a preset background image to obtain a final captured picture, wherein the computer-executed instruction is further used to perform the following steps:

extracting basic feature point information of the basic background image, and extracting shooting feature point information in the captured picture; and determining a matching relationship between each piece of the basic feature point information and each piece of the shooting feature point information, and determining the current background image in the captured picture according to the matching relationship, wherein the computer-executed instruction is further used to perform the following steps:

stitching a background portion in the captured picture and the basic background image according to the matching relationship, to obtain the current background image of the preset scene in the captured picture, wherein the computer-executed instruction is further used to perform the following steps:

extending a boundary of the current background image to obtain an extended background image; and replacing the extended background image in the captured picture with the preset background image correspondingly according to the extended background image, to obtain the final captured picture, wherein the computer-executed instruction is further used to perform the following steps:

performing any of the following enhancement processing on the extended background image to obtain an enhanced background image:

stitching seam feathering, light transformation; and replacing the enhanced background image in the captured picture with the preset background image correspondingly according to the enhanced background image, to obtain the final captured picture, and wherein the extended background image and the enhanced background image are images extended based on a current shooting angle.

* * * * *